(12) United States Patent
Zhu et al.

(10) Patent No.: US 12,700,904 B2
(45) Date of Patent: Aug. 4, 2026

(54) ANGLE OF DEPARTURE BASED CHANNEL STATE INFORMATION

(71) Applicant: LENOVO (BEIJING) LIMITED, Beijing (CN)

(72) Inventors: Chenxi Zhu, Fairfax, VA (US); Bingchao Liu, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 324 days.

(21) Appl. No.: 18/555,588

(22) PCT Filed: Apr. 16, 2021

(86) PCT No.: PCT/CN2021/087735
§ 371 (c)(1),
(2) Date: Oct. 16, 2023

(87) PCT Pub. No.: WO2022/217578
PCT Pub. Date: Oct. 20, 2022

(65) Prior Publication Data
US 2024/0214049 A1 Jun. 27, 2024

(51) Int. Cl.
*H04W 72/04* (2023.01)
*H04B 7/06* (2006.01)

(52) U.S. Cl.
CPC ......... *H04B 7/0626* (2013.01); *H04B 7/0632* (2013.01)

(58) Field of Classification Search
CPC .... H04B 7/0626; H04B 7/0632; H04B 7/063; H04W 24/10
See application file for complete search history.

(56) References Cited

U.S. PATENT DOCUMENTS

| | | | | |
|---|---|---|---|---|
| 8,976,884 B2 * | 3/2015 | Krishnamurthy | .... | H04B 7/0619 |
| | | | | 375/267 |
| 9,031,148 B2 * | 5/2015 | Wernersson | ....... | H04B 7/06952 |
| | | | | 375/267 |

(Continued)

FOREIGN PATENT DOCUMENTS

| | | |
|---|---|---|
| CN | 111866938 A | 10/2020 |
| CN | 112436872 A | 3/2021 |

(Continued)

OTHER PUBLICATIONS

PCT/CN2021/087735, "International Search Report and the Written Opinion of the International Searching Authority, or the Declaration", International Searching Authority, Jan. 13, 2022, pp. 1-6.

(Continued)

*Primary Examiner* — Lan-Huong Truong
(74) *Attorney, Agent, or Firm* — Kunzler Needham & Hilton

(57) ABSTRACT

Apparatuses, methods, and systems are disclosed for angle of departure based channel state information. One method includes estimating, at a receiving device, a channel from a transmitting device using reference signals. The method includes determining a set of up to N beam angle of departures from signals transmitted from the transmitting device having a signal strength greater than a predetermined threshold. The method includes determining a channel quality associated with each angle of departure of the set of up to N beam angle of departures. The method includes sending channel state information comprising information indicating the set of up to N beam angle of departures and the channel quality associated with each angle of departure of the set of up to N beam angle of departures.

16 Claims, 6 Drawing Sheets

(56)                     References Cited

U.S. PATENT DOCUMENTS

| | | | |
|---|---|---|---|
| 2016/0072562 A1 * | 3/2016 | Onggosanusi | H04B 7/0478 |
| | | | 370/329 |
| 2019/0116605 A1 * | 4/2019 | Luo | H04B 7/06952 |
| 2020/0008260 A1 | 1/2020 | Islam et al. | |

FOREIGN PATENT DOCUMENTS

| | | | |
|---|---|---|---|
| WO | WO-2016086144 A1 * | 6/2016 | H04W 72/046 |
| WO | 2019074761 A1 | 4/2019 | |
| WO | 2020146711 A1 | 7/2020 | |

OTHER PUBLICATIONS

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.
Intel Corp., "NR Positioning Enhancements for DL-AOD Method", 3GPP TSG RAN WG1 #104-e R1-2100659, Jan. 25-Feb. 5, 2021, pp. 1-11.

* cited by examiner

200

Remote Unit
102

Processor
202

Memory
204

Input Device
206

Display
208

Transmitter
210

Receiver
212

300

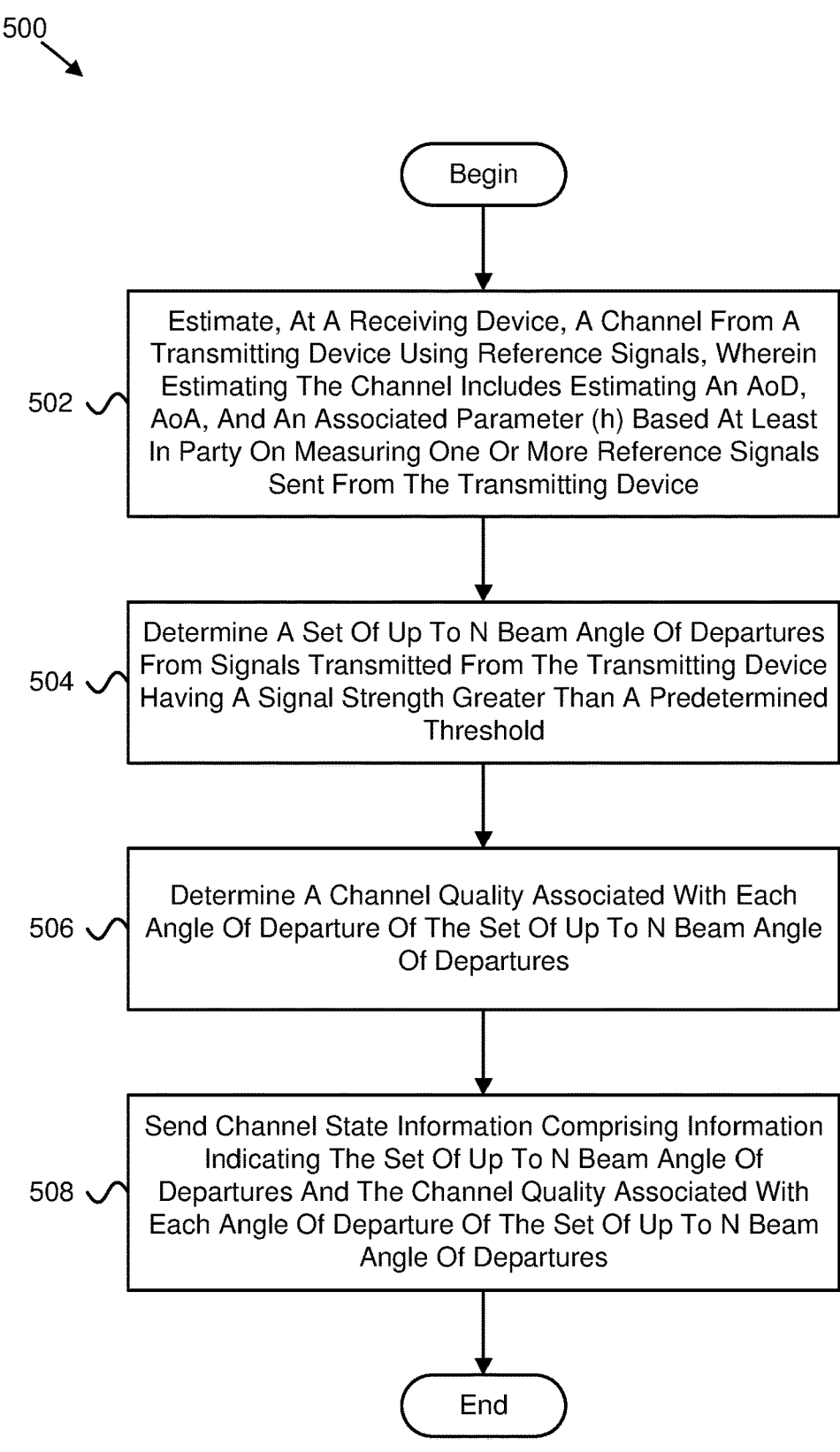

500

Begin

502 — Estimate, At A Receiving Device, A Channel From A Transmitting Device Using Reference Signals, Wherein Estimating The Channel Includes Estimating An AoD, AoA, And An Associated Parameter (h) Based At Least In Party On Measuring One Or More Reference Signals Sent From The Transmitting Device 504 — Determine A Set Of Up To N Beam Angle Of Departures From Signals Transmitted From The Transmitting Device Having A Signal Strength Greater Than A Predetermined Threshold 506 — Determine A Channel Quality Associated With Each Angle Of Departure Of The Set Of Up To N Beam Angle Of Departures 508 — Send Channel State Information Comprising Information Indicating The Set Of Up To N Beam Angle Of Departures And The Channel Quality Associated With Each Angle Of Departure Of The Set Of Up To N Beam Angle Of Departures End

Begin

602   Transmit, From A Transmitting Device, Reference Signals To A Receiving Device For Estimating The Channel 604   Receive Channel State Information Comprising Information Indicating A Set Of Up To N Beam Angle Of Departures And A Channel Quality Associated With Each Angle Of Departure Of The Set Of Up To N Beam Angle Of Departures From The Receiving Device End

ANGLE OF DEPARTURE BASED CHANNEL STATE INFORMATION

FIELD

The subject matter disclosed herein relates generally to wireless communications and more particularly relates to angle of departure based channel state information.

BACKGROUND

In certain wireless communications networks, large antenna arrays may be used for high frequency transmission and/or reception. For example, large antenna arrays may be used for transmission and/or reception of signals that operate in a Terahertz band.

BRIEF SUMMARY

Methods for angle of departure based channel state information are disclosed. Apparatuses and systems also perform the functions of the methods. In one embodiment, the method includes estimating, at a receiving device, a channel from a transmitting device using reference signals. In various embodiments, the method includes determining a set of up to N beam angle of departures from signals transmitted from the transmitting device having a signal strength greater than a predetermined threshold. In some embodiments, the method includes determining a channel quality associated with each angle of departure of the set of up to N beam angle of departures. In certain embodiments, the method includes sending channel state information comprising information indicating the set of up to N beam angle of departures and the channel quality associated with each angle of departure of the set of up to N beam angle of departures.

An apparatus for angle of departure based channel state information, in one embodiment, includes a receiving device. The apparatus also includes a processor configured to: estimate a channel from a transmitting device using reference signals; determine a set of up to N beam angle of departures from signals transmitted from the transmitting device having a signal strength greater than a predetermined threshold; and determine a channel quality associated with each angle of departure of the set of up to N beam angle of departures. The apparatus includes a transmitter configured to send channel state information comprising information indicating the set of up to N beam angle of departures and the channel quality associated with each angle of departure of the set of up to N beam angle of departures.

In various embodiments, a method for angle of departure based channel state information includes transmitting, from a transmitting device, reference signals to a receiving device for estimating the channel. In various embodiments, the method includes receiving channel state information comprising information indicating a set of up to N beam angle of departures and a channel quality associated with each angle of departure of the set of up to N beam angle of departures from the receiving device.

In some embodiments, an apparatus for angle of departure based channel state information includes a transmitting device. The apparatus also includes a transmitter configured to transmit reference signals to a receiving device for estimating the channel. The apparatus includes a receiver configured to receive channel state information comprising information indicating a set of up to N beam angle of departures and a channel quality associated with each angle of departure of the set of up to N beam angle of departures from the receiving device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a schematic flow chart diagram illustrating one embodiment of a method for angle of departure based channel state information.

DETAILED DESCRIPTION

Figure 1:
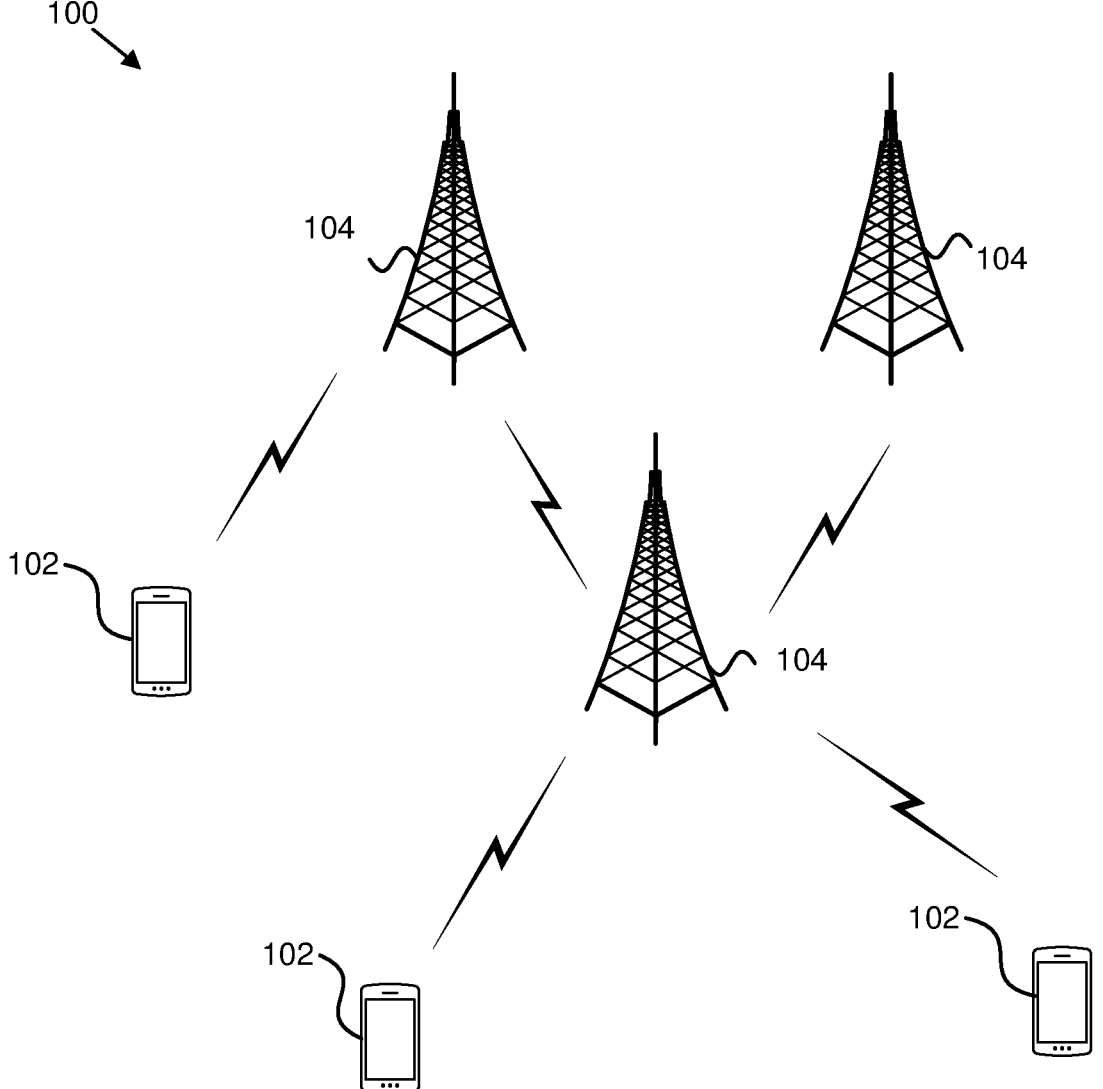
FIG. 1 is a schematic block diagram illustrating one embodiment of a wireless communication system for angle of departure based channel state information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising," "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the FIGS. illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for angle of departure based channel state information. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via uplink ("UL") communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNodeB ("gNB"), a Home Node-B, a RAN, a relay node, a device, a network device, an integrated and access backhaul ("IAB") node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the third generation partnership program ("3GPP") protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit downlink ("DL") communication signals to serve the remote units 102 in the time, frequency, and/or spatial domain.

In various embodiments, a remote unit 102 and/or a network unit 104 (e.g., a receiving device) may estimate a channel from a transmitting device (e.g., a remote unit 102 and/or a network unit 104) using reference signals. In various embodiments, the remote unit 102 and/or the network unit 104 may determine a set of up to N beam angle of departures from signals transmitted from the transmitting device having a signal strength greater than a predetermined threshold. In some embodiments, the remote unit 102 and/or the network unit 104 may determine a channel quality associated with each angle of departure of the set of up to N beam angle of departures. In certain embodiments, the remote unit 102 and/or the network unit 104 may send channel state information comprising information indicating the set of up to N beam angle of departures and the channel quality associated with each angle of departure of the set of up to N beam angle of departures. Accordingly, a remote unit 102 and/or a network unit 104 may be used for angle of departure based channel state information.

In some embodiments, a remote unit 102 and/or a network unit 104 (e.g., a transmitting device) may transmit reference signals to a receiving device (e.g., a remote unit 102 and/or a network unit 104) for estimating the channel. In various embodiments, the remote unit 102 and/or the network unit 104 may receive channel state information comprising information indicating a set of up to N beam angle of departures and a channel quality associated with each angle of departure of the set of up to N beam angle of departures from the receiving device. Accordingly, a remote unit 102 and/or a network unit 104 may be used for angle of departure based channel state information.

Figure 2:
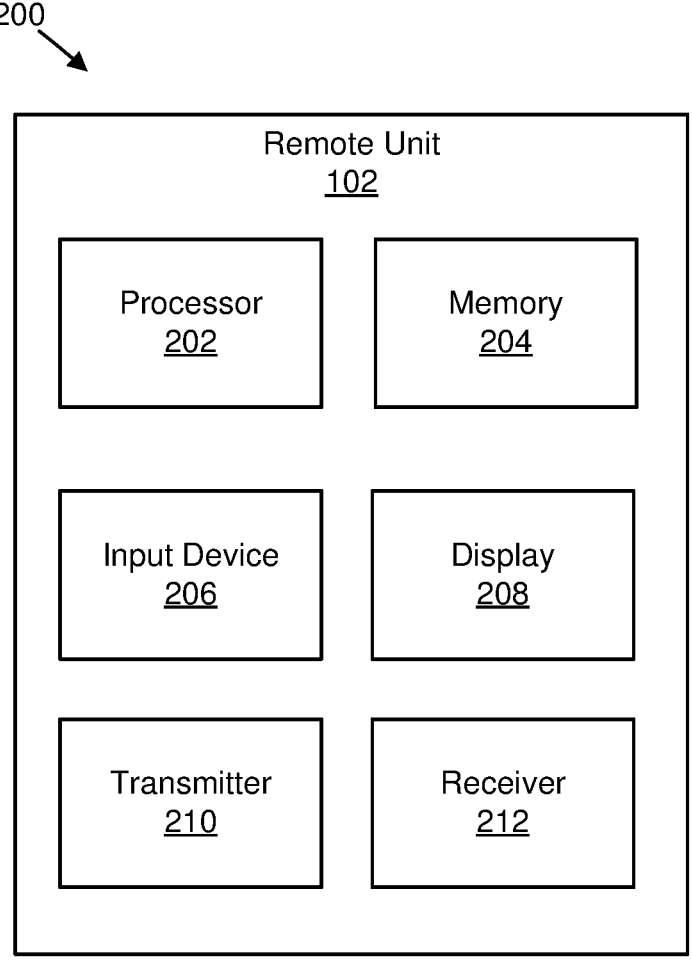
FIG. 2 is a schematic block diagram illustrating one embodiment of an apparatus that may be used for angle of departure based channel state information.

FIG. 2 depicts one embodiment of an apparatus 200 that may be used for angle of departure based channel state information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD") display, an LED display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the processor 202 may be configured to: estimate a channel from a transmitting device using reference signals; determine a set of up to N beam angle of departures from signals transmitted from the transmitting device having a signal strength greater than a predetermined threshold; and determine a channel quality associated with each angle of departure of the set of up to N beam angle of departures. In certain embodiments, the transmitter 210 may be configured to send channel state information comprising information indicating the set of up to N beam angle of departures and the channel quality associated with each angle of departure of the set of up to N beam angle of departures.

In some embodiments, the transmitter 210 may be configured to transmit reference signals to a receiving device for estimating the channel. In various embodiments, the receiver 212 may be configured to receive channel state information comprising information indicating a set of up to N beam angle of departures and a channel quality associated with each angle of departure of the set of up to N beam angle of departures from the receiving device.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
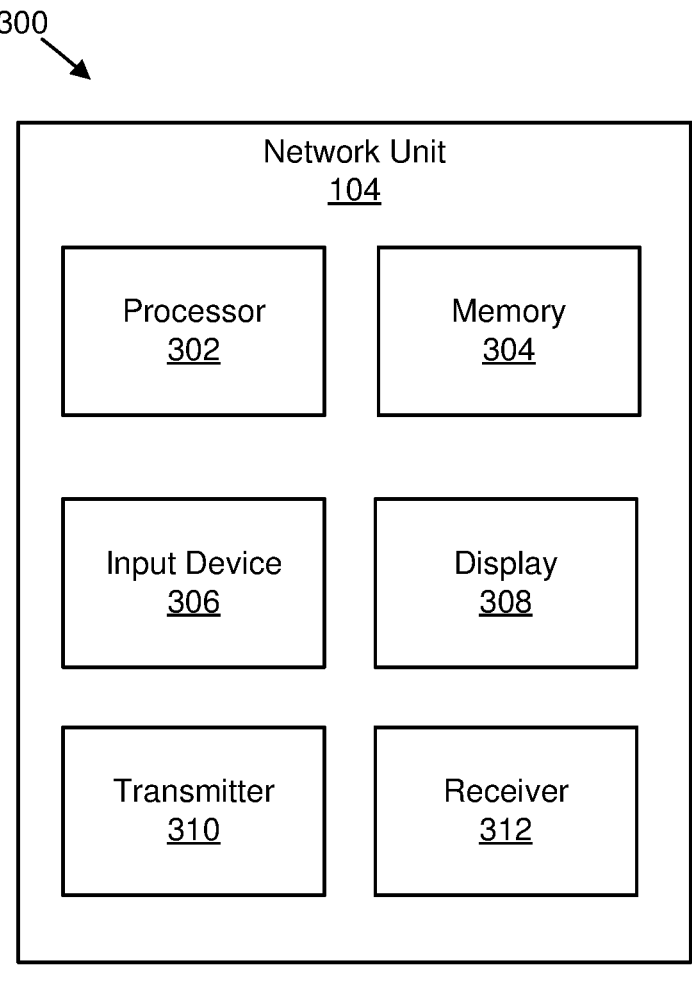
FIG. 3 is a schematic block diagram illustrating another embodiment of an apparatus that may be used for angle of departure based channel state information.

FIG. 3 depicts another embodiment of an apparatus 300 that may be used for angle of departure based channel state information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 may be configured to: estimate a channel from a transmitting device using reference signals; determine a set of up to N beam angle of departures from signals transmitted from the transmitting device having a signal strength greater than a predetermined threshold; and determine a channel quality associated with each angle of departure of the set of up to N beam angle of departures. In certain embodiments, the transmitter 310 may be configured to send channel state information comprising information indicating the set of up to N beam angle of departures and the channel quality associated with each angle of departure of the set of up to N beam angle of departures.

In some embodiments, the transmitter 310 may be configured to transmit reference signals to a receiving device for estimating the channel. In various embodiments, the receiver 312 may be configured to receive channel state information comprising information indicating a set of up to N beam angle of departures and a channel quality associated with each angle of departure of the set of up to N beam angle of departures from the receiving device.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, there may be a high data rate and/or large capacity in wireless communications. In certain embodiments, such as in 5G NR, there may be diverse requirements for enhanced mobile broadband ("eMBB"), ultra-reliable low-latency communication ("URLLC"), and massive machine type communications ("mMTC") and/or a high data throughput to more users and for more industrial internet of things ("IIoT") verticals. Such embodiments may be achieved with wide carrier bandwidth, massive MIMO, millimeter waves and additional spectrums (e.g., unlicensed spectrum). In some embodiments, between 400 MHz (e.g., frequency range 1 ("FR1"), frequency division duplexing ("FDD")) to 1 GHZ (e.g., frequency range 2 ("FR2"), time division duplexing ("TDD")) bandwidth may be used to provide a 20 Gbps DL rate per cell. In various embodiments, with more applications deployed over wireless networks (e.g., IIoT applications including self-driving cars, factory automation, telemedicine and others), support for data rates of 1000 Gbps or higher in a cell may be provided. In certain embodiments, a Terahertz ("THz") band (e.g., 0.1 to 10 THz) may be used.

As may be appreciated, compared with lower frequencies, communication in a THz range may have large differences. A THz band may have a wider bandwidth per channel compared to lower frequencies. Moreover, THz devices have lower transmission power than devices that operate with lower frequencies. For example, the output power of a power amplifier for THz communication may be quantified as being less than 1000 mW.

It should be noted that, compared with microwave and mmW, a THz channel may be characterized by directivity, atmospheric absorption, scintillation, scattering, and reflection. According to the Friis formula on free space propagation $$-P_r = P_t\left(\frac{\lambda}{4\pi R}\right)^2 G_t G_r,$$

where $\lambda$ is wavelength, $G_t$ and $G_r$ are the directional gains of transmit or transmitter ("TX") and receive or receiver ("RX") antennas. At a scattering limit, antenna gain may be determined by wavelength and effective antenna aperture $A_{eff}$ where $$G = \frac{4\pi A_{eff}}{\lambda^2}.$$

As may be appreciated, with a TX antenna and an RX antenna pointing to each other, an overall path loss decreases with the wavelength as follows:

$$P_r = P_t\frac{A_t A_r}{(\lambda R)^2}.$$

It should be noted that, besides free space loss, THz propagation may be impacted by atmospheric absorption including $H_2O$ and $O_2$ molecules.

In some embodiments, large pathloss (e.g., including absorption) coupled with low output power may make it necessary to use many power amplifiers ("PAs") to produce a required effective isotropic radiated power ("EIRP") for a transmitter. Massive MIMO with hundreds of antenna elements has been successfully used in the mmW range. In the THz range, an antenna array size may have more antenna elements than used with massive MIMO (e.g., thousands of antenna elements). In certain embodiments, a large antenna array may not only perform the task of spatial power combining from many low power PAs, but may also provide directional gain to facilitate compensating for large pathloss.

In various embodiments, channel state information ("CSI") may be tailored for a THz channel and massive MIMO antenna.

Figure 4:
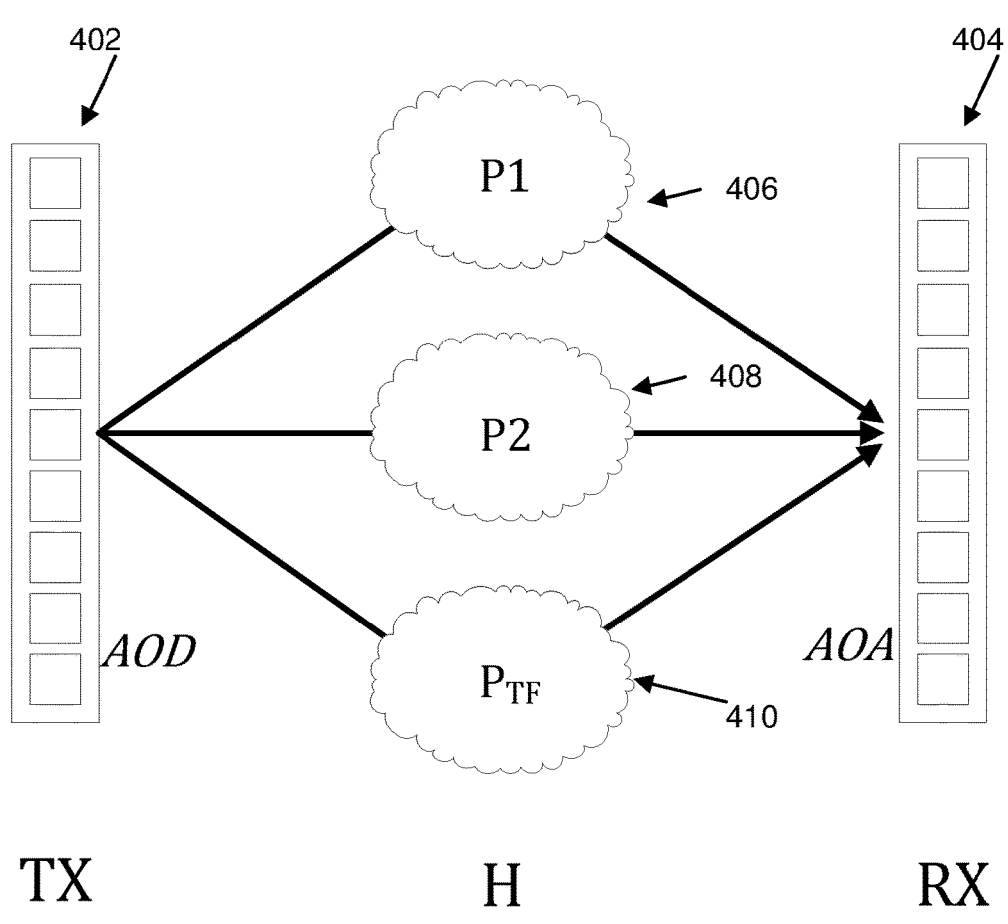
FIG. 4 is a schematic block diagram illustrating one embodiment of a discrete multipath channel.

FIG. 4 is a schematic block diagram 400 illustrating one embodiment of a discrete multipath channel. The diagram 400 includes a TX antenna 402 having multiple antenna elements. While only nine antenna elements are illustrated, the TX antenna 402 may have at least a hundred, a thousand, or more antenna elements. The diagram 400 also includes an RX antenna 404 having multiple antenna elements. While only nine antenna elements are illustrated, the RX antenna 404 may have at least a hundred, a thousand, or more antenna elements. Various signal paths may occur between the antenna elements of the TX antenna 402 and the RX antenna 404. For example, a first path 406 (P1) may have a specific angle of departure ("AoD") and a specific angle of arrival ("AoA"), a second path 408 (P2) may have a specific AoD and a specific AoA, a third path 410 ($P_{TF}$) may have a specific AoD and a specific AoA, and so forth up to H paths or channels. The TX antenna 402 may be located at a UE and/or a gNB. Moreover, the RX antenna 404 may be located at the UE and/or the gNB.

In various embodiments, the UE having the TX antenna 402 and/or the RX antenna 404 may be a portable UE (e.g., customer premises equipment ("CPE")) or a stationary UE (e.g., surveillance camera). The antenna elements of the TX antenna 402 and/or the RX antenna 404 may be arranged as a 1D uniform array or a 2D uniform array. Each antenna port of the TX antenna 402 and/or the RX antenna 404 may include one or more antenna elements in close proximity, and analog beamforming may be applied to the one or more antenna elements of an antenna port. Moreover, each antenna port of the TX antenna 402 and/or the RX antenna 404 may be connected with an independent radio frequency ("RF") chain including an UL converter, a DL converter, a digital-to-analog ("D-to-A") converter, an analog-to-digital ("A-to-D") converter, and/or a power amplifier.

In some embodiments, a channel may be dominated by a line of sight ("LoS") and a few non-line-of-site ("NLOS") paths between a TX antenna and an RX antenna. In such embodiments, if large antenna arrays are used in the TX antenna and the RX antenna, spatial resolution of the TX antenna and the RX antenna increases, and the channel may become increasing sparse in an angular domain. In other words, in a TX and/or RX angular domain, only a few angles (e.g., AoD, AoA) may carry significant strength. The channel may be represented as:

$$H(t, f) = \sum_{n=1}^{N_p} \beta_n a_R(\theta_n^R) a_T^H(\theta_n^T) e^{j2\pi v_n t} e^{-j2\pi \tau_n f} \quad (1)$$

Where the $N_T \times 1$ vector $a_T(\theta_T)$ is the beam response vector of the TX antenna in the AoD direction of $\theta_T$, and $N_R \times 1$ vector $a_R(\theta_R)$ is the beam response vector of the RX antenna in the AoA direction of $\theta_R$. For a 1D update location answer ("ULA") array, $$a_T(\theta_T) = \frac{1}{\sqrt{N_T}}\left[1, e^{-j2\pi\phi_T}, e^{-j2\pi 2\phi_T}, \ldots, e^{-j2\pi(N_T-1)\phi_T}\right]^T \quad (2)$$

$$a_R(\theta_R) = \frac{1}{\sqrt{N_R}}\left[1, e^{-j2\pi\phi_R}, e^{-j2\pi 2\phi_R}, \ldots, e^{-j2\pi(N_R-1)\phi_R}\right]^T, \quad (3)$$

where $$\phi_T = \frac{d_T \sin \theta_T}{\lambda}, \phi_R = \frac{d_R \sin \theta_R}{\lambda}$$

are the normalized AoD and AoA angle. The signal has a limited bandwidth W and a symbol duration T. A maximum angular spread for all physical AoDs and AoAs is:

$$\left(\theta_i^T, \theta_i^R\right) \in \left[-\pi/2, \pi/2\right] \times \left[-\pi/2, \pi/2\right].$$

Ignoring Doppler spread and considering the channel in subband i, $$H_i(f) = H(f_i) = \sum_{n=1}^{N_p} \beta_n e^{-j2\pi\tau_n f_i} a_R\left(\theta_n^R\right) a_T^H\left(\theta_n^T\right) \tag{4}$$

$$= \sum_{n=1}^{N_p} \beta_n^i a_R\left(\theta_n^R\right) a_T^H\left(\theta_n^T\right)$$

with $$\beta_n^i = \beta_n e^{-j2\pi\tau_n f_i}.$$

In the frequency domain, without losing generality a subband may be used and the subband index i may be dropped. A generic channel H may be written as:

$$H = \sum_{n=1}^{N_p} \beta_n a_R\left(\theta_n^R\right) a_T^H\left(\theta_n^T\right) \tag{5}$$

Which may be rewritten as $$\tilde{H} = DFT_{N_R} \cdot H \cdot DFT_{N_T}^H \tag{6}$$

where $$H_v(i, k) \approx \sum_{n \in S_{R,i} \cap S_{T,k}} \beta_n \tag{7}$$

$H_v(i,k)$ represents a distinct path with AoD k and AoA i, where $$S_{R,i} \triangleq \left\{ n: \theta_n^R \in \left( \frac{i}{N_R} - \frac{1}{2N_R}, \frac{i}{N_R} + \frac{1}{2N_R} \right] \right\}, \tag{8}$$

$$S_{T,k} \triangleq \left\{ n: \theta_n^T \in \left( \frac{k}{N_T} - \frac{1}{2N_T}, \frac{k}{N_T} + \frac{1}{2N_T} \right] \right\} \tag{9}$$

The approximation becomes better, and the matrix H becomes sparser as $N_T$ and $N_R$ increase. If there is at most one non-zero element in every row of H, H may be called row sparse. For a row sparse matrix H, its columns are orthogonal, and for its singular value decomposition ("SVD") $H=USV^H$ (e.g., V may be the identity matrix). This may imply that different TX beams with different AoDs are orthogonal without an additional precoder. For a TX beam in a direction k, an effective channel is a vector channel $H_v(:, k)$ (e.g., the kth column of matrix $H_v$) and the effective gain is $|H_v(:, k)|^2$.

In certain embodiments, there may be a mechanism for channel measurement and feedback between a transmitter and a receiver. In such embodiments, the transmitter may transmit a series of reference signals for the receiver to conduct measurements and obtain channel information. Moreover, the receiver may provide CSI to the transmitter to enable the TX to transmit based on the channel information. Because of channel sparsity, singular modes of the channel are the AoD beams with significant strength ($|H_v(:, k)|$). The CSI may take the following form: $\{(k_1, Q_1), (k_2, Q_2), \ldots, (k_N, Q_{kN})\}$, where a total of N TX beams and their associated quality measurements are signaled to the RX. For each signaled TX beam i, $k_i$ is the AoD of the TX beam i given in terms of quantized angles (e.g., 1D or 2D depending on whether the TX panel is able to direct its beam in 1D or 2D), and $Q_i$ is a channel quality measurement of TX beam i. This channel quality measurement may be a quantized value of: 1) a channel gain $|H_v(:, k)|^2$; 2) a norm of an effective channel $|H_v(:, k)|$; 3) received reference signal power k ("RSRPk"), which is equal to $P_{RS}|H_v(:, k)|^2$ where $P_{RS}$ is the RS transmission power; or 4) the signal to noise ratio k ("SNRK"), which is equal to RSRPk divided by noise and interference power (PN). SNRK=RSRPk/PN. SNRK may be represented as dB, or by a corresponding modulation and coding scheme ("MCS") value that may be supported by the SNR value.

In some embodiments, CSI information of a total of N TX beams transmitted to a TX enables the TX to flexibly determine how many beams (e.g., layers) to use for transmission to an RX. The TX may choose up to N beams to transmit up to N layers of data. The TX may also know a received quality of the transmission on each of the beams.

FIG. 5 a schematic flow chart diagram illustrating one embodiment of a method 500 for angle of departure based channel state information. In some embodiments, the method 500 is performed by an apparatus, such as the remote unit 102 and/or the network unit 104. In certain embodiments, the method 500 may be performed by a processor executing program code, for example, a microcontroller, a microprocessor, a CPU, a GPU, an auxiliary processing unit, a FPGA, or the like.

In certain embodiments, the method 500 may include estimating 502, at a receiving device, a channel from a transmitting device using reference signals. In various embodiments, the method 500 includes determining 504 a set of up to N beam angle of departures from signals transmitted from the transmitting device having a signal strength greater than a predetermined threshold. In some embodiments, the method 500 includes determining 506 a channel quality associated with each angle of departure of the set of up to N beam angle of departures. In certain embodiments, the method 500 includes sending 508 channel state information comprising information indicating the set of up to N beam angle of departures and the channel quality associated with each angle of departure of the set of up to N beam angle of departures.

In certain embodiments, the angle of departure is in one direction if a transmit beam of the transmitting device is steerable in only one dimension, and the information indicating the set of up to N beam angle of departures indicates each angle of departure as a value indicating the corresponding angle of departure in the one dimension.

In some embodiments, the angle of departure is in two directions if the transmit beam of the transmitting device is steerable in two dimensions, and the information indicating the set of up to N beam angle of departures indicates each angle of departure as two values indicating the corresponding angle of departure in the two directions. In various embodiments, the channel quality associated with each angle of departure of the set of up to N beam angle of departures comprises a value representing an effective channel gain of the corresponding angle of departure. In one embodiment, the channel quality associated with each angle of departure of the set of up to N beam angle of departures comprises a value representing a norm of an effective channel vector of the corresponding angle of departure.

In certain embodiments, the channel quality associated with each angle of departure of the set of up to N beam angle of departures comprises a value representing a reference signal received power of the corresponding angle of departure. In some embodiments, the channel quality associated with each angle of departure of the set of up to N beam angle of departures comprises a value representing a signal to noise ratio, a signal to interference and noise ratio, or a combination thereof of the corresponding angle of departure. In various embodiments, the channel quality associated with each angle of departure of the set of up to N beam angle of departures comprises a value representing a highest modulation and coding scheme of the corresponding angle of departure.

In one embodiment, a value of N is determined by the receiving device. In certain embodiments, a value of N is determined by the transmitting device. In some embodiments, the transmitting device comprises a base station and the receiving device comprises a user equipment.

Figure 6:
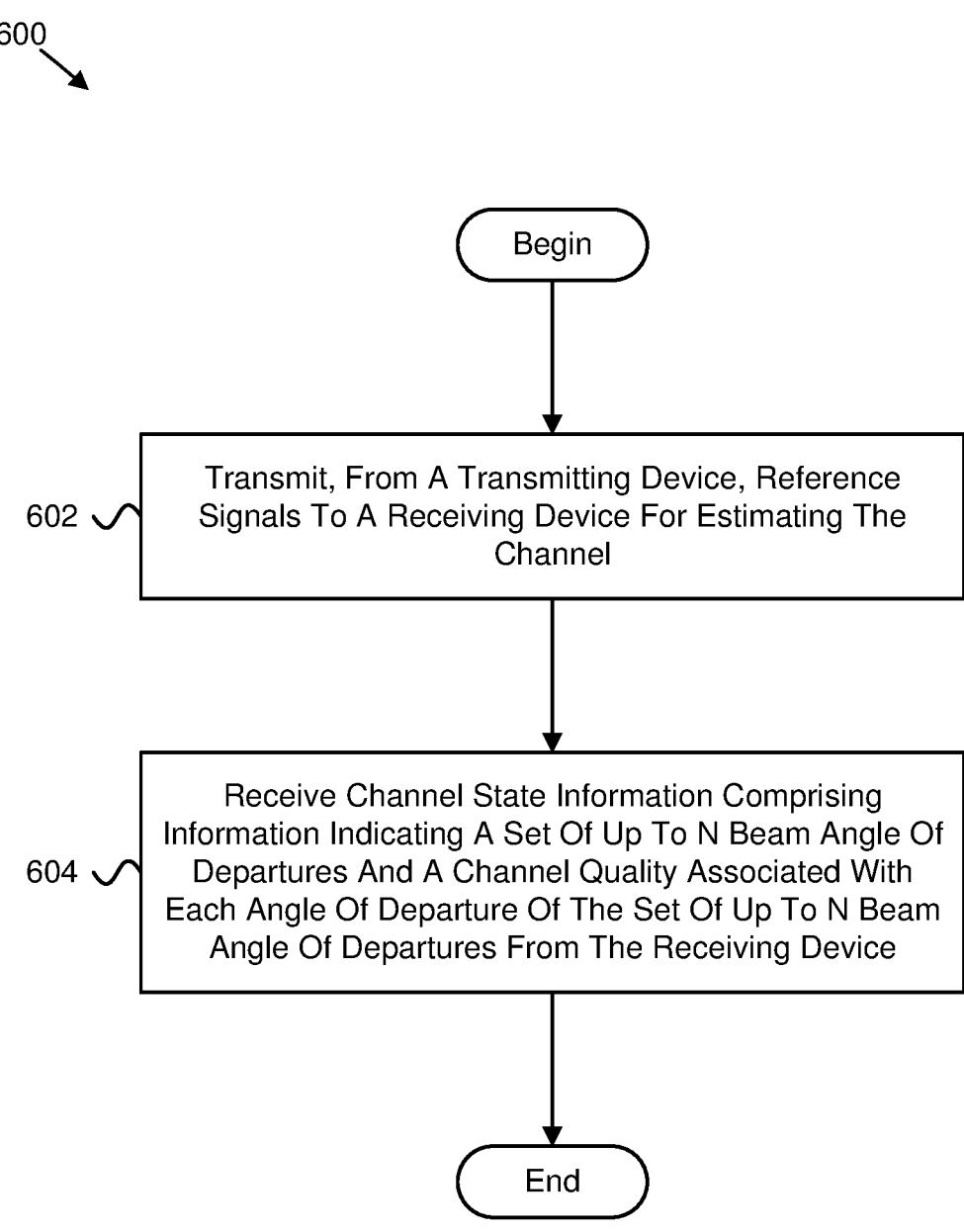
FIG. 6 is a schematic flow chart diagram illustrating another embodiment of a method for angle of departure based channel state information.

FIG. 6 is a schematic flow chart diagram illustrating another embodiment of a method 600 for angle of departure based channel state information. In some embodiments, the method 600 is performed by an apparatus, such as the remote unit 102 and/or the network unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602, from a transmitting device, reference signals to a receiving device for estimating the channel. In various embodiments, the method 600 includes receiving 604 channel state information comprising information indicating a set of up to N beam angle of departures and a channel quality associated with each angle of departure of the set of up to N beam angle of departures from the receiving device.

In certain embodiments, the angle of departure is in one direction if a transmit beam of the transmitting device is steerable in only one dimension, and the information indicating the set of up to N beam angle of departures indicates each angle of departure as a value indicating the corresponding angle of departure in the one dimension. In some embodiments, the angle of departure is in two directions if the transmit beam of the transmitting device is steerable in two dimensions, and the information indicating the set of up to N beam angle of departures indicates each angle of departure as two values indicating the corresponding angle of departure in the two directions. In various embodiments, the channel quality associated with each angle of departure of the set of up to N beam angle of departures comprises a value representing an effective channel gain of the corresponding angle of departure.

In one embodiment, the channel quality associated with each angle of departure of the set of up to N beam angle of departures comprises a value representing a norm of an effective channel vector of the corresponding angle of departure. In certain embodiments, the channel quality associated with each angle of departure of the set of up to N beam angle of departures comprises a value representing a reference signal received power of the corresponding angle of departure. In some embodiments, the channel quality associated with each angle of departure of the set of up to N beam angle of departures comprises a value representing a signal to noise ratio, a signal to interference and noise ratio, or a combination thereof of the corresponding angle of departure.

In various embodiments, the channel quality associated with each angle of departure of the set of up to N beam angle of departures comprises a value representing a highest modulation and coding scheme of the corresponding angle of departure. In one embodiment, a value of N is determined by the receiving device. In certain embodiments, a value of N is determined by the transmitting device.

In some embodiments, the transmitting device determines a transmission rank, the set of up to N beam angle of departures, and a modulation and coding scheme used for transmissions to the receiving device based on the channel state information received from the receiving device. In various embodiments, the transmitting device comprises a base station and the receiving device comprises a user equipment.

In one embodiment, a method comprises: estimating, at a receiving device, a channel from a transmitting device using reference signals; determining a set of up to N beam angle of departures from signals transmitted from the transmitting device having a signal strength greater than a predetermined threshold; determining a channel quality associated with each angle of departure of the set of up to N beam angle of departures; and sending channel state information comprising information indicating the set of up to N beam angle of departures and the channel quality associated with each angle of departure of the set of up to N beam angle of departures.

In certain embodiments, the angle of departure is in one direction if a transmit beam of the transmitting device is steerable in only one dimension, and the information indicating the set of up to N beam angle of departures indicates each angle of departure as a value indicating the corresponding angle of departure in the one dimension.

In some embodiments, the angle of departure is in two directions if the transmit beam of the transmitting device is steerable in two dimensions, and the information indicating the set of up to N beam angle of departures indicates each angle of departure as two values indicating the corresponding angle of departure in the two directions.

In various embodiments, the channel quality associated with each angle of departure of the set of up to N beam angle of departures comprises a value representing an effective channel gain of the corresponding angle of departure.

In one embodiment, the channel quality associated with each angle of departure of the set of up to N beam angle of departures comprises a value representing a norm of an effective channel vector of the corresponding angle of departure.

In certain embodiments, the channel quality associated with each angle of departure of the set of up to N beam angle of departures comprises a value representing a reference signal received power of the corresponding angle of departure.

In some embodiments, the channel quality associated with each angle of departure of the set of up to N beam angle of departures comprises a value representing a signal to noise ratio, a signal to interference and noise ratio, or a combination thereof of the corresponding angle of departure.

In various embodiments, the channel quality associated with each angle of departure of the set of up to N beam angle of departures comprises a value representing a highest modulation and coding scheme of the corresponding angle of departure.

In one embodiment, a value of N is determined by the receiving device.

In certain embodiments, a value of N is determined by the transmitting device.

In some embodiments, the transmitting device comprises a base station and the receiving device comprises a user equipment.

In one embodiment, an apparatus comprises a receiving device. The apparatus further comprises: a processor configured to: estimate a channel from a transmitting device using reference signals; determine a set of up to N beam angle of departures from signals transmitted from the transmitting device having a signal strength greater than a predetermined threshold; and determine a channel quality associated with each angle of departure of the set of up to N beam angle of departures; and a transmitter configured to send channel state information comprising information indicating the set of up to N beam angle of departures and the channel quality associated with each angle of departure of the set of up to N beam angle of departures.

In certain embodiments, the angle of departure is in one direction if a transmit beam of the transmitting device is steerable in only one dimension, and the information indicating the set of up to N beam angle of departures indicates each angle of departure as a value indicating the corresponding angle of departure in the one dimension.

In some embodiments, the angle of departure is in two directions if the transmit beam of the transmitting device is steerable in two dimensions, and the information indicating the set of up to N beam angle of departures indicates each angle of departure as two values indicating the corresponding angle of departure in the two directions.

In various embodiments, the channel quality associated with each angle of departure of the set of up to N beam angle of departures comprises a value representing an effective channel gain of the corresponding angle of departure.

In one embodiment, the channel quality associated with each angle of departure of the set of up to N beam angle of departures comprises a value representing a norm of an effective channel vector of the corresponding angle of departure.

In certain embodiments, the channel quality associated with each angle of departure of the set of up to N beam angle of departures comprises a value representing a reference signal received power of the corresponding angle of departure.

In some embodiments, the channel quality associated with each angle of departure of the set of up to N beam angle of departures comprises a value representing a signal to noise ratio, a signal to interference and noise ratio, or a combination thereof of the corresponding angle of departure.

In various embodiments, the channel quality associated with each angle of departure of the set of up to N beam angle of departures comprises a value representing a highest modulation and coding scheme of the corresponding angle of departure.

In one embodiment, a value of N is determined by the receiving device.

In certain embodiments, a value of N is determined by the transmitting device.

In some embodiments, the transmitting device comprises a base station and the receiving device comprises a user equipment.

In one embodiment, a method comprises: transmitting, from a transmitting device, reference signals to a receiving device for estimating the channel; and receiving channel state information comprising information indicating a set of up to N beam angle of departures and a channel quality associated with each angle of departure of the set of up to N beam angle of departures from the receiving device.

In certain embodiments, the angle of departure is in one direction if a transmit beam of the transmitting device is steerable in only one dimension, and the information indicating the set of up to N beam angle of departures indicates each angle of departure as a value indicating the corresponding angle of departure in the one dimension.

In some embodiments, the angle of departure is in two directions if the transmit beam of the transmitting device is steerable in two dimensions, and the information indicating the set of up to N beam angle of departures indicates each angle of departure as two values indicating the corresponding angle of departure in the two directions.

In various embodiments, the channel quality associated with each angle of departure of the set of up to N beam angle of departures comprises a value representing an effective channel gain of the corresponding angle of departure.

In one embodiment, the channel quality associated with each angle of departure of the set of up to N beam angle of departures comprises a value representing a norm of an effective channel vector of the corresponding angle of departure.

In certain embodiments, the channel quality associated with each angle of departure of the set of up to N beam angle of departures comprises a value representing a reference signal received power of the corresponding angle of departure.

In some embodiments, the channel quality associated with each angle of departure of the set of up to N beam angle of departures comprises a value representing a signal to noise ratio, a signal to interference and noise ratio, or a combination thereof of the corresponding angle of departure.

In various embodiments, the channel quality associated with each angle of departure of the set of up to N beam angle of departures comprises a value representing a highest modulation and coding scheme of the corresponding angle of departure.

In one embodiment, a value of N is determined by the receiving device.

In certain embodiments, a value of N is determined by the transmitting device.

In some embodiments, the transmitting device determines a transmission rank, the set of up to N beam angle of departures, and a modulation and coding scheme used for transmissions to the receiving device based on the channel state information received from the receiving device.

In various embodiments, the transmitting device comprises a base station and the receiving device comprises a user equipment.

In one embodiment, an apparatus comprises a transmitting device. The apparatus further comprises: a transmitter configured to transmit reference signals to a receiving device for estimating the channel; and a receiver configured to receive channel state information comprising information indicating a set of up to N beam angle of departures and a channel quality associated with each angle of departure of the set of up to N beam angle of departures from the receiving device.

In certain embodiments, the angle of departure is in one direction if a transmit beam of the transmitting device is steerable in only one dimension, and the information indicating the set of up to N beam angle of departures indicates each angle of departure as a value indicating the corresponding angle of departure in the one dimension.

In some embodiments, the angle of departure is in two directions if the transmit beam of the transmitting device is steerable in two dimensions, and the information indicating the set of up to N beam angle of departures indicates each angle of departure as two values indicating the corresponding angle of departure in the two directions.

In various embodiments, the channel quality associated with each angle of departure of the set of up to N beam angle of departures comprises a value representing an effective channel gain of the corresponding angle of departure.

In one embodiment, the channel quality associated with each angle of departure of the set of up to N beam angle of departures comprises a value representing a norm of an effective channel vector of the corresponding angle of departure.

In certain embodiments, the channel quality associated with each angle of departure of the set of up to N beam angle of departures comprises a value representing a reference signal received power of the corresponding angle of departure.

In some embodiments, the channel quality associated with each angle of departure of the set of up to N beam angle of departures comprises a value representing a signal to noise ratio, a signal to interference and noise ratio, or a combination thereof of the corresponding angle of departure.

In various embodiments, the channel quality associated with each angle of departure of the set of up to N beam angle of departures comprises a value representing a highest modulation and coding scheme of the corresponding angle of departure.

In one embodiment, a value of N is determined by the receiving device.

In certain embodiments, a value of N is determined by the transmitting device.

In some embodiments, the transmitting device determines a transmission rank, the set of up to N beam angle of departures, and a modulation and coding scheme used for transmissions to the receiving device based on the channel state information received from the receiving device.

In various embodiments, the transmitting device comprises a base station and the receiving device comprises a user equipment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

estimating, at a receiving device, a channel from a transmitting device using reference signals;

determining a set of up to N beam angle of departures (AoDs) from signals transmitted from the transmitting device having a signal strength greater than a predetermined threshold;

determining a channel quality associated with each AoD of the set of up to N beam AoDs; and sending channel state information (CSI) comprising information indicating the set of up to N beam AoDs and the channel quality associated with each AoD of the set of up to N beam AoDs, wherein the AoD is in one direction if a transmit beam of the transmitting device is steerable in only one dimension, and the information indicating the set of up to N beam AoDs indicates each AoD as a value indicating the corresponding AoD in the one dimension.

2. The method of claim 1, wherein the AoD is in two directions if a transmit beam of the transmitting device is steerable in two dimensions, and the information indicating the set of up to N beam AoDs indicates each AoD as two values indicating the corresponding AoD in the two directions.

3. The method of claim 1, wherein the channel quality associated with each AoD of the set of up to N beam AoDs comprises a value representing:

an effective channel gain of the corresponding AoD;

an effective channel vector of the corresponding AoD;

a reference signal received power of the corresponding AoD;

a signal to noise ratio, a signal to interference and noise ratio, or a combination thereof of the corresponding AoD;

a highest modulation and coding scheme of the corresponding AoD; or a combination thereof.

4. The method of claim 1, wherein the transmitting device comprises a base station and the receiving device comprises a UE.

5. A user equipment (UE), comprising:

at least one memory; and at least one processor coupled with the at least one memory and configured to cause the UE to:

estimate a channel from a transmitting device using reference signals;

determine a set of up to N beam AoDs from signals transmitted from the transmitting device having a signal strength greater than a predetermined threshold; and determine a channel quality associated with each AoD of the set of up to N beam AoDs; and send channel state information (CSI) comprising information indicating the set of up to N beam AoDs and the channel quality associated with each AoD of the set of up to N beam AoDs, wherein the AoD is in one direction if a transmit beam of the transmitting device is steerable in only one dimension, and the information indicating the set of up to N beam AoDs indicates each AoD as a value indicating the corresponding AoD in the one dimension.

6. The UE of claim 5, wherein the AoD is in two directions if the transmit beam of the transmitting device is steerable in two dimensions, and the information indicating the set of up to N beam AoDs indicates each AoD as two values indicating the corresponding AoD in the two directions.

7. The UE of claim 5, wherein the channel quality associated with each AoD of the set of up to N beam AoDs comprises a value representing:

an effective channel gain of the corresponding AoD;

an effective channel vector of the corresponding AoD;

a reference signal received power of the corresponding AoD;

a signal to noise ratio, a signal to interference and noise ratio, or a combination thereof of the corresponding AoD;

a highest modulation and coding scheme of the corresponding AoD; or a combination thereof.

8. The UE of claim 5, wherein the transmitting device comprises a base station.

9. A base station, comprising:

at least one memory; and at least one processor coupled with the at least one memory and configured to cause the base station to:

transmit, from a transmitting device, reference signals to a receiving device for estimating a channel; and receive channel state information (CSI) comprising information indicating a set of up to N beam AoDs and a channel quality associated with each AoD of the set of up to N beam AoDs from the receiving device, wherein the AoD is in one direction if a transmit beam of the transmitting device is steerable in only one dimension, and the information indicating the set of up to N beam AoDs indicates each AoD as a value indicating the corresponding AoD in the one dimension.

10. The base station of claim 9, wherein the AoD is in two directions if a transmit beam of the transmitting device is steerable in two dimensions, and the information indicating the set of up to N beam AoDs indicates each AoD as two values indicating the corresponding AoD in the two directions.

11. The base station of claim 9, wherein the channel quality associated with each AoD of the set of up to N beam AoDs comprises a value representing:

an effective channel gain of the corresponding AoD;

an effective channel vector of the corresponding AoD;

a reference signal received power of the corresponding AoD;

a signal to noise ratio, a signal to interference and noise ratio, or a combination thereof of the corresponding AoD;

a highest modulation and coding scheme of the corresponding AoD; or a combination thereof.

12. The base station of claim 9, wherein the transmitting device determines a transmission rank, the set of up to N beam AoDs, and a modulation and coding scheme used for transmissions to the receiving device based on the CSI received from the receiving device.

13. The base station of claim 9, wherein the transmitting device comprises a base station and the receiving device comprises a UE.

14. A processor for wireless communication, comprising:

at least one controller coupled with at least one memory and configured to cause the processor to:

estimate, at a receiving device, a channel from a transmitting device using reference signals;

determine a set of up to N beam angle of departures (AoDs) from signals transmitted from the transmitting device having a signal strength greater than a predetermined threshold;

determine a channel quality associated with each AoD of the set of up to N beam AoDs; and send channel state information (CSI) comprising information indicating the set of up to N beam AoDs and the channel quality associated with each AoD of the set of up to N beam AoDs, wherein the AoD is in one direction if a transmit beam of the transmitting device is steerable in only one dimension, and the information indicating the set of up to N beam AoDs indicates each AoD as a value indicating the corresponding AoD in the one dimension.

15. The processor of claim 14, wherein the AoD is in two directions if a transmit beam of the transmitting device is steerable in two dimensions, and the information indicating the set of up to N beam AoDs indicates each AoD as two values indicating the corresponding AoD in the two directions.

16. The processor of claim 14, wherein the channel quality associated with each AoD of the set of up to N beam AoDs comprises a value representing:

an effective channel gain of the corresponding AoD;

an effective channel vector of the corresponding AoD;

a reference signal received power of the corresponding AoD;

a signal to noise ratio, a signal to interference and noise ratio, or a combination thereof of the corresponding AoD;

a highest modulation and coding scheme of the corresponding AoD; or a combination thereof.

* * * * *